US008978748B2

(12) United States Patent
Perrin et al.

(10) Patent No.: US 8,978,748 B2
(45) Date of Patent: Mar. 17, 2015

(54) METHOD OF CONTROLLING A VARIABLE DELIVERY PUMP FITTED TO A HEATING SYSTEM

(71) Applicants: Alfa Laval Corporate AB, Lund (SE); Alfa Laval Hes, Lentilly (FR)

(72) Inventors: Matthieu Perrin, Lyons (FR); Stéphane Thomazic, Lentilly (FR)

(73) Assignees: Alfa Laval Corporate AB, Lund (SE); Alfa Laval Hes, Lentilly (FR)

( * ) Notice: Subject to any disclaimer, the term of this patent is extended or adjusted under 35 U.S.C. 154(b) by 0 days.

(21) Appl. No.: 14/353,269

(22) PCT Filed: Oct. 12, 2012

(86) PCT No.: PCT/EP2012/070343
§ 371 (c)(1),
(2) Date: Apr. 21, 2014

(87) PCT Pub. No.: WO2013/060585
PCT Pub. Date: May 2, 2013

(65) Prior Publication Data
US 2015/0013961 A1    Jan. 15, 2015

(30) Foreign Application Priority Data

Oct. 27, 2011   (EP) ..................................... 11306397

(51) Int. Cl.
*F24D 19/10* (2006.01)
*F24D 3/02* (2006.01)
*F24D 9/00* (2006.01)

(52) U.S. Cl.
CPC .............. *F24D 19/1012* (2013.01); *F24D 3/02* (2013.01); *F24D 9/00* (2013.01); *F24D 19/1069* (2013.01)
USPC ........... 165/292; 165/293; 165/294; 165/297; 165/298; 165/299; 165/300; 236/78 D; 237/8 R; 237/8 A

(58) Field of Classification Search
USPC ......... 165/292, 293, 294, 297, 298, 299, 300; 236/78 D; 237/8 A, 8 R
See application file for complete search history.

(56) References Cited

U.S. PATENT DOCUMENTS 3,820,590 A * 6/1974 Littman et al. ................. 165/292
4,574,870 A * 3/1986 Weitman ......................... 165/292
5,052,472 A * 10/1991 Takahashi et al. ............. 165/299
(Continued)

FOREIGN PATENT DOCUMENTS

| DE | 203 16 026 U1 | 7/2004 |
| DE | 10 2008 028 375 A1 | 12/2009 |
| GB | 2 368 896 A | 5/2002 |
| JP | 04169795 A * | 6/1992 |
| JP | 2007085582 A * | 4/2007 |

OTHER PUBLICATIONS

International Search Report (PCT/ISA/210) mailed on Dec. 20, 2012, by the European Patent Office as the International Searching Authority for International Application No. PCT/EP2012/070343.
(Continued)

*Primary Examiner* — John Ford
(74) *Attorney, Agent, or Firm* — Buchanan Ingersoll & Rooney PC

(57) ABSTRACT

Method of controlling a variable delivery pump fitted to a heating system comprising: a heat exchanger connected to two circuits of fluids, the variable delivery pump making it possible to vary the flow-rate of the first fluid inside the heat exchanger; a return loop on the primary circuit allowing the first fluid reaching the input of the heat exchanger to mix with a portion of the first fluid coming from the output of the exchanger; a first temperature sensor measuring a temperature of the second fluid coming from the secondary circuit; a second temperature sensor measuring a temperature of the first fluid coming from a primary circuit; a control unit electrically connected to the first and second temperature sensors, the sensors generating electrical signals as functions of the temperatures and constituting electrical input signals of the control unit.

17 Claims, 1 Drawing Sheet

(56) References Cited

U.S. PATENT DOCUMENTS

| | | | | |
|---|---|---|---|---|
| 5,335,708 A | * | 8/1994 | Murakami et al. | 165/297 |
| 6,051,819 A | * | 4/2000 | Ottosson | 219/496 |
| 7,069,976 B2 | * | 7/2006 | Lindgren | 165/292 |
| 2011/0259322 A1 | * | 10/2011 | Davis et al. | 126/640 |

OTHER PUBLICATIONS

Written Opinion (PCT/ISA/237) mailed on Dec. 20, 2012, by the European Patent Office as the International Searching Authority for International Application No. PCT/EP2012/070343.

* cited by examiner

METHOD OF CONTROLLING A VARIABLE DELIVERY PUMP FITTED TO A HEATING SYSTEM

TECHNICAL FIELD

The invention relates to the field of heating systems used in particular to produce domestic hot water or heating for a building, a block of flats, or a plurality of housing units built in close proximity to one another.

The invention is aimed more specifically at a method of controlling a variable delivery pump fitted to a primary circuit in which there flows a first fluid allowing a second fluid in a secondary circuit to heat up through a heat exchanger. The primary circuit thus comprises a heat source for supplying the first fluid with calories which are transmitted to the second fluid via the heat exchanger.

PRIOR ART

Heating systems are generally known in which the variable delivery pumps are controlled by a control unit as a function of the temperature of the second fluid output from the heat exchanger.

When this temperature is low, the control unit then generates an instruction to the pump to increase its delivery thereby allowing an increase in the transfer of calories between the first fluid and the second fluid inside the heat exchanger.

However, said method of controlling the variable delivery pump may generate a surge effect, namely that the pump is activated and then stopped repeatedly, generating high energy consumption and possible premature wear of the pump.

Likewise, such a method generates significant energy losses in the primary circuit since the temperature of the first fluid flowing in the primary circuit has to be constantly raised to meet an instantaneous energy demand in the heat exchanger.

The purpose of the invention is thus to adjust the control of the variable delivery pump by taking account of the temperature of both the first and second fluids at the respective heat exchanger outputs.

Another objective is to reduce the energy losses generated by the primary circuit.

Another objective is to reduce clogging of the exchanger.

Lastly, another objective is to make the maximum pump delivery self-adjusting whatsoever the actual use to which the heating system is put.

DISCLOSURE OF THE INVENTION

The invention relates therefore to a method of controlling a variable delivery pump fitted to a heating system comprising:
- a heat exchanger connected to two circuits of fluids, and wherein a first fluid coming from a primary circuit transmits heat energy to a second fluid coming from a secondary circuit, said variable delivery pump making it possible to vary the flow rate of the first fluid inside the heat exchanger;
- a return loop on the primary circuit allowing the first fluid reaching the heat exchanger input to be mixed with a portion of the first fluid coming from the exchanger output;
- a first temperature sensor S1 provided at the heat exchanger output and measuring a temperature T1 of the second fluid coming from the secondary circuit;
- a second temperature sensor S3 provided at the heat exchanger output and measuring a temperature T3 of the first fluid coming from the primary circuit;
- a control unit electrically connected to said first and second temperature sensors S1, S3, said sensors generating electrical signals as a function of the temperatures T1 and T3 and constituting control unit input electrical signals, said control unit being capable of generating at output an instruction for controlling the variable delivery pump;

characterised in that the variable delivery pump control instruction is generated by comparing each temperature T1 and T3 respectively relative to a threshold value $T_{th}1$ and $T_{th}3$, and in that:
- when said temperatures T1 and T3 are simultaneously below the threshold values $T_{th}1$ and $T_{th}3$ respectively, the rated voltage of the control instruction signal increases in order to step up pump delivery, and;
- when the temperatures T1 and T3 are simultaneously above the threshold values $T_{th}1$ and $T_{th}3$ respectively, the rated voltage of the control instruction signal decreases in order to reduce pump delivery.

In other words, the temperatures T1 and T3 of the first and second fluids are measured at the heat exchanger outputs, and the temperature sensors S1 and S3 transmit an electrical signal to the control unit. These temperatures T1 and T3 are then compared with a threshold value, $T_{th}1$ and $T_{th}3$ so as to generate the pump control instruction.

When there is a demand for heat energy on both the primary circuit and the secondary circuit, and therefore when the temperatures T1 and T3 are simultaneously below the threshold values $T_{th}1$ and $T_{th}3$, the rated voltage of the pump control instruction is then increased thereby stepping up pump delivery.

Conversely, if the temperatures T1 and T3 are simultaneously above the threshold values $T_{th}1$ and $T_{th}3$, it means that there is no need for calorie transmission in the heat exchanger and consequently, the rated voltage of the pump control instruction signal is decreased in order to reduce the pump delivery.

To advantage, the threshold value $T_{th}1$ may be a function of the thermal demands of a user on the secondary circuit.

Put another way, the threshold value of the temperature T1 of the second fluid at the heat exchanger output is determined as a function of the use which is made of the second fluid. Indeed, this temperature of $T_{th}1$ is not the same if it is a question of domestic hot water or heating water which may in particular be used in a low temperature heating system such as underfloor heating or the like.

In practice, the heating system may comprise a third temperature sensor S2 provided at the heat exchanger input and measuring a temperature T2 of the second fluid coming from the secondary circuit, and in that the threshold value $T_{th}3$ is a function of the temperature T2 of the second fluid.

The control unit thus generates the control instruction using the signal coming from the third temperature sensor S2 positioned at the exchanger input on the secondary circuit.

Furthermore, the threshold temperature $T_{th}3$ is constantly adapted as a function of the temperature T2 measured by the temperature sensor S2. According to one particular embodiment, the threshold value may be equal to the sum between the temperature T2 and a predetermined value $T_{perf}$ as a function of the performance of said heat exchanger.

In other words, to determine the threshold temperature $T_{th}3$, the instantaneous temperature T2 of the second fluid is added to a predetermined value $T_{perf}$ which may vary from one heat exchanger to another as a function of the effectiveness of the heat transfer.

To advantage, the predetermined value $T_{perf}$ may be between 5° C. and 25° C., and more specifically between 10° C. and 20° C.

The poorer the performance of the heat exchanger the higher said predetermined value $T_{perf}$, and conversely the better the performance of the heat exchanger the lower the predetermined value $T_{perf}$.

In practice, the rated voltage of the pump control instruction signal may be variable between 0 and 10 Volt.

According to other alternatives, the pump control instruction signal may also be implemented with a current the strength of which varies between 4 and 20 mA or again correspond to a signal the voltage of which is of the 230 Volts (3 points) type.

According to one particular embodiment, the rated voltage of the pump control instruction signal may be a function of the rated voltage of at least one of the two signals coming from the first and second temperature sensors S1, S3.

Put another way, the control unit may transmit directly to the pump the signal generated by at least one of the two temperature sensors S1, S3. It may also apply a correction factor to this signal before transmitting it to the pump.

In all cases, the rated voltage of the pump control instruction signal is then proportionate to the rated voltage of at least one of the two signals coming from the first and second temperature sensors S1, S3.

To advantage, the rated voltage of the signal coming from the first temperature sensor S1 may be compared with the rated voltage of the signal coming from the second temperature sensor S3 and the rated voltage of the pump control instruction signal may be generated as a function of the smallest rated voltage of the two signals coming from the first and second temperature sensors S1, S3.

In this case, the control unit is used to identify the minimum rated voltage between the signals coming from the first and second temperature sensors S1, S3. This minimum voltage is then used to generate the rated voltage of the pump control instruction signal.

According to a first embodiment, the control unit is able to control a three-way valve provided on the primary circuit at the exchanger input, this three-way valve being capable of mixing the first fluid reaching the heat exchanger input with a portion of the first fluid coming from the exchanger output via the return loop.

Put another way, the return of the first fluid through the return loop is regulated by means of the three-way valve. The flow-rate of this portion of the first fluid returning to the heat exchanger input is then variable as a function of the state of the three-way valve controlled by the control unit.

In this case, the rated voltage of the three-way valve control instruction signal may be a function of the rated voltage of the signal coming from the first temperature sensor S1.

The control unit is thus able to use directly the rated voltage of the signal coming from the first temperature sensor S1 to generate the three-way valve control instruction.

In practice, the heating system may comprise a fourth temperature sensor S4 provided at the heat exchanger input and measuring a temperature T4 of the first fluid coming from the primary circuit, and the rated voltage of the three-way valve control instruction signal may be a function of the rated voltage of the signal coming from the fourth temperature sensor S4.

In other words, to generate the three-way valve control instruction, use is also made of the signal coming from the fourth temperature sensor S4 provided at the heat exchanger input on the primary circuit.

According to one particular embodiment, the rated voltage of the signal coming from the first temperature sensor S1 may then be compared with the rated voltage of the signal coming from the fourth temperature sensor S4 and the rated voltage of the three-way valve control instruction signal may then be generated as a function of the smallest rated voltage of the two signals coming from the first and fourth temperature sensors S1, S4.

The control unit is thus able to compare the rated voltage of the signals coming from the first and fourth temperature sensors S1, S4 and then use directly the minimum voltage identified to generate the three-way valve control instruction.

Just as previously, a correction coefficient may be used, and consequently the voltage of the three-way valve control instruction signal remains proportionate to the minimum voltage of the signals supplied by the temperature sensors S1, S4.

According to a second embodiment, the control unit is able to control a two-way valve provided on the primary circuit downstream from the return loop, the two-way valve being capable of orientating the first fluid coming from the exchanger output in the direction of the heat exchanger input via the return loop.

The control unit then controls the opening or closing of this two-way valve, so as to vary the quantity of fluid flowing in the return loop.

In this alternative, the rated voltage of the two-way valve control instruction signal may be a function of the rated voltage of the signal coming from the first temperature sensor S1.

The control unit thus uses directly the rated voltage of the signal coming from the first temperature sensor S1 to generate the two-way valve control instruction.

To advantage, the heating system may comprise a fourth temperature sensor S4 provided at the heat exchanger input and measuring a temperature T4 of the first fluid coming from the primary circuit, and the rated voltage of the two-way valve control instruction signal may be a function of the rated voltage of the signal coming from the fourth temperature sensor S4.

Put another way, to generate the two-way valve control instruction, use is also made of the signal coming from the fourth temperature sensor S4 arranged at the heat exchanger input on the primary circuit.

According to one particular embodiment, the rated voltage of the signal coming from the first temperature sensor S1 may be compared with the rated voltage of the signal coming from the fourth temperature sensor S4 and the rated voltage of the two-way valve control instruction signal may be generated as a function of the smallest rated voltage of the two signals coming from the first and fourth temperature sensors S1, S4.

The control unit is thus able to compare the rated voltage of the signals coming from the first and fourth temperature sensors S1, S4 and then uses directly the minimum rated voltage to generate the two-way valve control instruction.

Just as previously, a correction coefficient may be used and the voltage of the two-way valve control instruction signal is proportionate to the minimum voltage of the signals supplied by the temperature sensors S1, S4.

BRIEF DESCRIPTION OF THE FIGURES

The way in which the invention may be implemented and the resulting advantages will become clearer from the description of the following embodiment, given for information purposes and non-restrictively, supported by the figures wherein.

DETAILED DESCRIPTION OF THE INVENTION

As already mentioned, the invention relates to a method of controlling a variable delivery pump fitted to a heating system.

Figure 1:
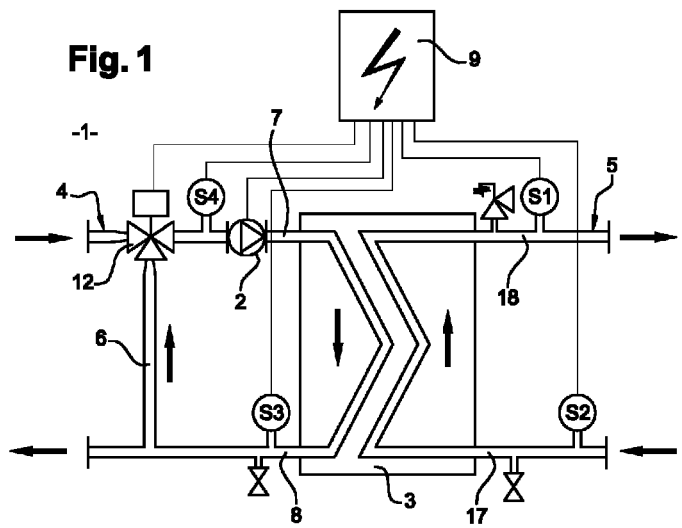
FIG. 1 shows diagrammatically a first alternative of a heating system comprising a variable delivery pump controlled by the method according to the invention.

As shown in FIG. 1 the heating system 1 comprises a heat exchanger 3 in which a first fluid transmits its calories to a second fluid. The first fluid flows inside a primary circuit 4 and enters the heat exchanger 3 at an input 7 and then re-emerges at an output 8. Likewise the second fluid flows in a secondary circuit 5 and enters the heat exchanger 3 at an input 17 and re-emerges at an output 18.

As shown the primary circuit 4 also comprises a return loop 6 allowing a portion of the first fluid emerging from the heat exchanger to return in the direction of the input 7 of the heat exchanger. A three-way valve provided at the input 7 of the heat exchanger 3 can then be used to regulate the flow rate of the first fluid flowing in the return loop 6.

Furthermore, a variable delivery pump 2 can be used to control the flow-rate of the first fluid inside the heat exchanger 3.

Moreover, a control unit 9 can be used to control the variable delivery pump 2 and the three-way valve 12. To do this, the control unit 9 collects information coming from the temperature sensors positioned at the input and output of the heat exchanger 3. Thus, said heating system 1 comprises a first temperature sensor S1 positioned at the heat exchanger output on the secondary circuit. It also comprises a second temperature sensor S3 positioned at the heat exchanger output 8 on the primary circuit 4.

Additionally, said heating system 1 may also comprise a third temperature sensor S2 provided at the heat exchanger input 17 on the secondary circuit 5. Likewise, in another alternative of the invention, the system 1 may comprise a fourth temperature sensor S4 positioned at the heat exchanger input 7 on the primary circuit 4. As previously specified, the control unit 9 determines the control instruction applied to the variable delivery pump 2 mainly as a function of the signals coming from the temperature sensors S1 and S3. When said temperature is below the threshold values $T_{th}1$ and $T_{th}3$, the rated voltage of the instruction signal for controlling the pump increases, in order to step up pump delivery.

Conversely, when the raised temperatures T1 and T3 are simultaneously higher than the threshold values $T_{th}1$ and $T_{th}3$, the control unit 9 reduces the rated voltage of the instruction signal for controlling the variable delivery pump 2 in order to reduce pump delivery.

To advantage, the rated voltage of the pump control instruction signal may be generated directly by comparing the signals coming from the first and second sensors S1, S3 and by using the one that has the lowest rated voltage.

Likewise, the rated voltage of the instruction signal for controlling the three-way valve 12 may be generated directly by comparing the signals coming from the first and fourth temperature sensors S1, S4 and by using the one that has the lowest rated voltage.

Figure 2:
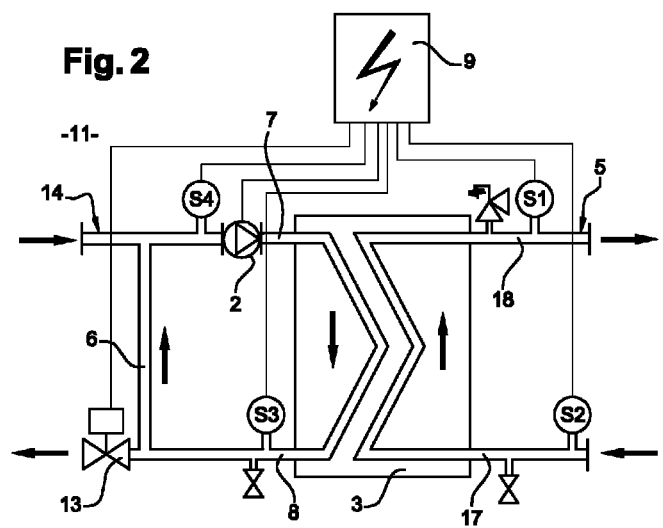
FIG. 2 shows diagrammatically a second alternative of a heating system comprising a variable delivery pump controlled by the method according to the invention.

As shown in FIG. 2, and according to another alternative, the heating system 11 may comprise a two-way valve 13 allowing the three-way valve previously shown in FIG. 1 to be replaced. Indeed, said two-way valve 13 is also used to regulate the flow rate of the first fluid flowing in the return loop 6.

It is clear from what has been said above that a method of controlling a variable delivery pump according to the invention has a large number of advantages, and in particular:

it means that surge effects in the pump are avoided;
it guarantees an optimum instantaneous heat exchange with the second fluid;
it means that the energy losses generated by the primary circuit are reduced;
it means that the clogging effect can be reduced by reducing the temperature of the first fluid entering the exchanger;
it means that the maximum flow rate of the first fluid can be automatically and self-adaptingly self-adjusted without requiring manual intervention or any additional adjustment.

The invention claimed is:

1. Method of controlling a variable delivery pump fitted to a heating system comprising:
   a heat exchanger connected to two circuits of fluids, and wherein a first fluid coming from a primary circuit transmits heat energy to a second fluid coming from a secondary circuit, said variable delivery pump making it possible to vary the flow-rate of the first fluid inside the heat exchanger;
   a return loop on the primary circuit allowing the first fluid reaching the input of the heat exchanger to mix with a portion of the first fluid coming from the output of the exchanger;
   a first temperature sensor provided at the output of the heat exchanger and measuring a first temperature of the second fluid coming from the secondary circuit;
   a second temperature sensor arranged at the output of the heat exchanger and measuring a second temperature of the first fluid coming from a primary circuit;
   a control unit electrically connected to said first and second temperature sensors said sensors generating electrical signals as functions of the temperatures and constituting electrical input signals of the control unit, said control unit being capable of generating at output an instruction for controlling the variable delivery pump;
   wherein the instruction for controlling the variable delivery pump is generated by comparing each first and second temperature respectively relative to first and second threshold values, and in that:
   when said first and second temperatures are simultaneously below the first and second threshold values respectively the rated voltage of the control instruction signal increases in order to step up the delivery of the pump, and;
   when the first and second temperatures are simultaneously higher than the first and second threshold values respectively the rated voltage of the control instruction signal decreases in order to reduce the delivery of the pump.

2. Method as claimed in claim 1, wherein the first threshold value is a function of the thermal demands of a user on the secondary circuit.

3. Method as claimed in claim 1, wherein the heating system comprises a third temperature sensor provided at the input of the heat exchanger and measuring a third temperature of the second fluid coming from the secondary circuit, and in that the second threshold value is a function of the third temperature of the second fluid.

4. Method as claimed in claim 3, wherein the second threshold value is equal to the sum between the third temperature and a predetermined value dependent on the performance of said heat exchanger.

5. Method as claimed in claim 4, wherein said predetermined value is between 5° C. and 25° C.

6. Method as claimed in claim 5, wherein said predetermined value is more specifically between 10° C. and 20° C.

7. Method as claimed in claim 1, wherein the rated voltage of the instruction signal for controlling the pump is variable between 0 and 10 Volt.

8. Method as claimed in claim 1, wherein the rated voltage of the instruction signal for controlling the pump is a function of the rated voltage of at least one of the two signals coming from the first and second temperature sensors.

9. Method as claimed in claim 8, wherein the rated voltage of the signal coming from the first temperature sensor is compared with the rated voltage of the signal coming from the second temperature sensor and in that the rated voltage of the instruction signal for controlling the pump is generated as a function of the smallest rated voltage of the two signals coming from the first and second temperature sensors.

10. Method as claimed in claim 1, wherein the control unit controls a three-way valve provided on the primary circuit at the input of the exchanger, said three-way valve being capable of mixing the first fluid reaching the input of the heat exchanger with a portion of the first fluid coming from the output of the exchanger via the return loop.

11. Method as claimed in claim 10, wherein the rated voltage of the instruction signal for controlling the three-way valve is a function of the rated voltage of the signal coming from the first temperature sensor.

12. Method as claimed in claim 11, wherein the heating system comprises a fourth temperature sensor provided at the input of the heat exchanger and measuring a fourth temperature of the first fluid coming from the primary circuit, and in that the rated voltage of the instruction signal for controlling the three-way valve is a function of the rated voltage of the signal coming from the fourth temperature sensor.

13. Method as claimed in claim 12, wherein the rated voltage of the signal coming from the first temperature sensor is compared with the rated voltage of the signal coming from the fourth temperature sensor and in that the rated voltage of the instruction signal for controlling the three-way valve is generated as a function of the smallest rated voltage of the two signals coming from the first and fourth temperature sensors.

14. Method as claimed in claim 1, wherein the control unit controls a two-way valve provided on the primary circuit downstream from the return loop, said two-way valve being capable of orientating the first fluid coming from the output of the exchanger in the direction of the input of the heat exchanger via the return loop.

15. Method as claimed in claim 14, wherein the rated voltage of the instruction signal for controlling the two-way valve is a function of the rated voltage of the signal coming from the first temperature sensor.

16. Method as claimed in claim 15, wherein the heating system comprises a fourth temperature sensor provided at the input of the heat exchanger and measuring a fourth temperature of the first fluid coming from the primary circuit, and in that the rated voltage of the instruction signal for controlling the two-way valve is a function of the rated voltage of the signal coming from the fourth temperature sensor.

17. Method as claimed in claim 16, wherein the rated voltage of the signal coming from the first temperature sensor is compared with the rated voltage of the signal coming from the fourth temperature sensor and in that the rated voltage of the instruction signal for controlling the two-way valve is generated as a function of the smallest rated voltage of the two signals coming from the first and fourth temperature sensors.

* * * * *